Nov. 6, 1923.
F. MAYER
HYDRAULIC COUPLING
Filed Sept. 10, 1920
1,472,930
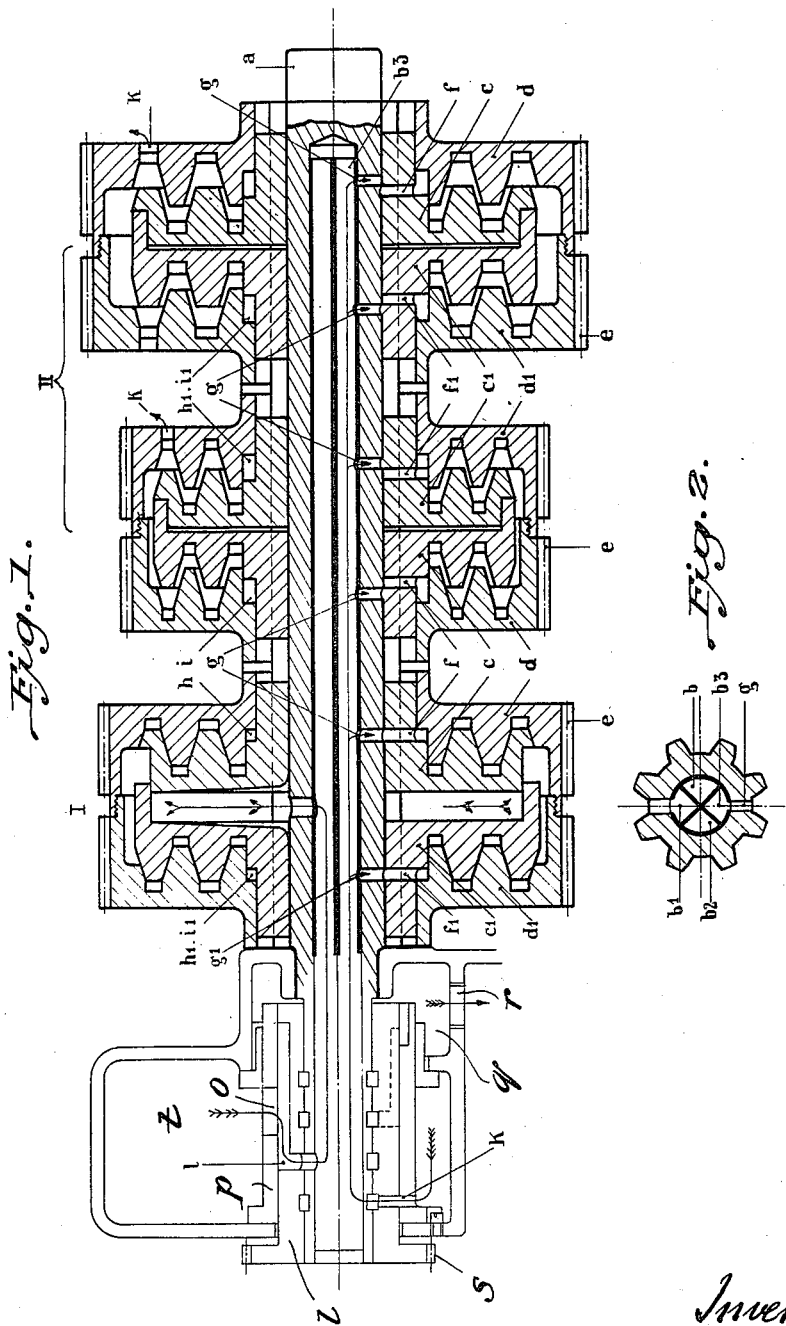

Patented Nov. 6, 1923.

1,472,930

UNITED STATES PATENT OFFICE.

FRITZ MAYER, OF ULM, BAVARIA, GERMANY, ASSIGNOR, BY DIRECT AND MESNE ASSIGNMENTS, TO JOHN KELLER, OF OBERLENNINGEN-TECK, WURTTEMBERG, GERMANY.

HYDRAULIC COUPLING.

Application filed September 10, 1920. Serial No. 409,492.

*To all whom it may concern:*

Be it known that I, FRITZ MAYER, a citizen of Germany, residing at Ulm-on-the-Danube, in the State of Bavaria, Republic of Germany, have invented certain new and useful Improvements in Hydraulic Couplings, of which the following is a specification, reference being had therein to the accompanying drawing.

My invention relates to hydraulic couplings, and the particular object of my invention is to produce a hydraulic coupling in which the coupling members are automatically disconnected without any friction.

In the accompanying drawings illustrating one embodiment of my invention by way of example, Fig. 1 is a longitudinal central section through the new coupling, while Fig. 2 is a cross-section through the hollow transmission shaft.

The transmission shaft $a$ is made hollow to permit therethrough the flow of oil or other suitable liquid under pressure for effecting the connecting and disconnecting operations. The hollow shaft contains as many separate oil-conduits $b$ as there are couplings on the shaft plus an additional conduit for the purpose hereinafter mentioned. Thus, in the embodiment shown there are provided four separate oil conduits $b$, $b^1$, $b^2$, $b^3$, the conduits $b$, $b^1$, $b^2$ being intended for the connecting operation for each coupling and the conduit $b^3$ for the disconnecting operation for all couplings.

The inner coupling members $c$, $c^1$ are axially movable along the transmission shaft $a$ tho prevented from turning thereon relative to the shaft, and they are formed with pistons on which the oil under pressure acts to move the said members towards each other and towards the outer coupling members $d$, $d^1$, which latter are seated on the inner coupling members $c$ $c^1$ with their hubs $h$, $i$ which are shaped like stepped pistons. The outer coupling members are formed at their periphery with teeth $e$ adapted to mesh with corresponding gears (not shown) mounted on another shaft (not shown).

The inner coupling members $c$, $c^1$ are provided with bores $f$, $f^1$, corresponding to bores $g$, $g^1$ in the wall of the hollow transmission shaft $a$.

Through these bores $g$, $f$ and $g^1$, $f^1$ oil under pressure can be supplied, flowing through the oil conduits $b$, $b^1$, etc., in the hollow shaft. For disconnecting the couplings, the oil flows through the oil conduit $b^3$ above referred to, the oil acting on and operating the stepped pistons $h$, $i$. The bores $g$ and $f$ are so arranged that when a coupling is connected (see coupling marked I in Fig. 1) the corresponding bores $g$ and $f$ are in register with each other thus affording an inlet for the oil, whereas when a coupling is disconnected (see the couplings marked II in Fig. 1), the corresponding bores $g$, $f$ are offset relative to each other, therefore being closed to the oil.

For controlling the flow of oil under pressure, the rotative cylindrical member $l$ at the left of Fig. 1 is provided, which in its outer surface has a number of channels adapted to effect communication between the oil tank $t$ and the various oil conduits $b$, $b^1$, etc., in the hollow shaft $a$. For the purpose of disconnecting a coupling, the said cylindrical member $l$ is turned in such a way, as to open up communication to the oil conduit $b^3$. In the position of the parts shown in Fig. 1 the oil flowing through conduit $b^3$ will pass through the open bores $g$, $f$ corresponding to the coupling marked I and thus will act on and operate the stepped pistons $h$, $i$ and $h^1$, $i^1$ thereby moving the inner coupling members $c$, $c^1$ towards each other disconnecting them from their corresponding outer coupling members $d$, $d^1$. By this axial movement of the inner coupling members $c$, $c^1$, the bores $g$ and $f$ are offset relative to each other, as seen in connection with the disconnected couplings marked II in Fig. 1 (see bores $g^1$ $f^1$). By the axial movement of the inner coupling members $c$, $c^1$ lengthwise of shaft $a$ all metal friction between these coupling members and the outer coupling members $d$, $d^1$ is eliminated, and in this disconnected state the outer coupling members retain metallic contact with the inner coupling members only at the hub $h$, $i$. The inner coupling members $c$, $c^1$, by their displacement are positioned exactly in the middle position of the coupling, overlapping each other at their circumference as clearly shown in Fig. 1.

A number of oil ducts $k$ are provided in the outer coupling members $d$, $d^1$ to prevent any oil, either in the connected or the disconnected state of the couplings from remaining between the frictional surfaces of the coupling members which would otherwise counteract the overlapping engagement between the inner coupling members.

The oil under pressure is contained in the tank *t* above referred to and shown at the left hand side of Fig. 1. The oil has access to the ducts in the cylindrical member *l* through an opening *o* in a stationary part *p* surrounding the rotative cylindrical member *l*, which at its outer end is formed with a toothed gear *s* whereby the member *l* may be rotated to bring the different ducts cut in its surface into communication with the oil conduits in shaft *x*. The oil flowing back through the said oil conduits is collected in a chamber *q* from which the oil escapes through a port *r* into a collecting vessel (not shown) from which it may be returned to the tank *t* by a pump (not shown).

I claim as my invention:

1. In a hydraulic coupling, the combination with a hollow shaft provided with separate longitudinal conduits therein and having bores in its wall, and means for controlling the flow of a liquid under pressure through the said conduits, of sets of inner coupling members mounted on the said shaft for relative axial movement thereon and provided with bores adapted to register with the bores in the wall of the said hollow shaft, stepped pistons formed on the said inner coupling members, corresponding sets of outer coupling members adapted to frictionally engage with the said inner coupling members and having hubs corresponding to the said stepped pistons, the contact between the said inner and outer coupling members being restricted to the said hubs and pistons upon the said coupling members being disconnected.

2. A hydraulic coupling as specified in claim 1, in which the said inner coupling members are provided at their circumference with overlapping portions, the said outer coupling members being provided with ducts for the escape of any liquid under pressure adapted to counteract the overlapping engagement of the said inner coupling members.

In testimony whereof I have hereunto affixed my signature in the presence of two witnesses.

FRITZ MAYER.

Witnesses:
JOHN KELLER,
MAX MÜLLER.